(12) United States Patent
Mohammad

(10) Patent No.: US 6,675,305 B1
(45) Date of Patent: Jan. 6, 2004

(54) POWER SAVING IN A USB PERIPHERAL BY PROVIDING GATED CLOCK SIGNAL TO CSR BLOCK IN RESPONSE TO A LOCAL INTERRUPT GENERATED WHEN AN OPERATION IS TO BE PERFORMED

(75) Inventor: Saleem Chisty Mohammad, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 609 days.

(21) Appl. No.: 09/632,476

(22) Filed: Aug. 4, 2000

(51) Int. Cl.[7] .................................................. G06F 1/32
(52) U.S. Cl. ........................................ 713/322; 710/18
(58) Field of Search .............................. 713/322; 710/18

(56) References Cited

U.S. PATENT DOCUMENTS

| | | | | |
|---|---|---|---|---|
| 5,628,020 A | * | 5/1997 | O'Brien ........................ | 713/322 |
| 5,661,751 A | * | 8/1997 | Johnson ....................... | 375/219 |
| 5,815,725 A | * | 9/1998 | Feierbach .................... | 713/322 |
| 5,834,961 A | * | 11/1998 | Hillan et al. ................. | 327/295 |
| 6,370,603 B1 | * | 4/2002 | Silverman et al. ............ | 710/72 |
| 6,467,042 B1 | * | 10/2002 | Wright et al. ................ | 713/320 |

OTHER PUBLICATIONS http://www.techweb.com/encyclopedia/defineterm?term=register; CMP Media, Inc., Manhasset, N.Y. 11030 USA; p. 1; Apr. 11, 2000.

http://www.techweb.com/encyclopedia/defineterm?term=usb; CMP Media, Inc., Manhasset, N.Y. 11030 USA; pp. 1–4; Mar. 30, 2000.

Hoffman, Gary; and Moore, Daniel; *IEEE 1394: A Ubiquitous Bus*; COMPCON '95, San Francisco, CA; pp. 1–10; Mar. 5 to 9, 1995.

Hoffman, Gary; *IEEE 1394, the A/V Digital Interface of Choice*; http://www.skipstone.com/newspap.html; pp. 1–4; Adaptec, Inc.; Austin, Texas, 78759–5321 USA; Jan. 1996.

* cited by examiner

*Primary Examiner*—Thomas Lee
*Assistant Examiner*—Albert Wang
(74) *Attorney, Agent, or Firm*—Bever, Hoffman & Harms, LLP; Jeanette S. Harms

(57) ABSTRACT

A method and system for selectively providing a gated clock signal to a control and status register block is provided. The method performs an operation by an application on a CSR block is provided. The operation may be programming a control register or reading a status register. The application detects when the operation is needed. If the operation is to be performed, a gated clock signal is enabled to the control and status register. The application then performs the operation on the control and status register block based on the gated clock signal. The gated clock signal may disabled after the operation has been performed. A system is provided for performing an operation on a control and status register block in a universal serial bus peripheral is provided. Clock gating logic detects when the operation is to be performed and provides a gated clock signal to the control and status register block when the operation is to be performed. Application logic performs the operation on the control and status register block based on the gated clock signal. A gated clock logic is also provided which controls a gated clock signal which enables an operation to be performed on a control and status register block by an application.

9 Claims, 3 Drawing Sheets

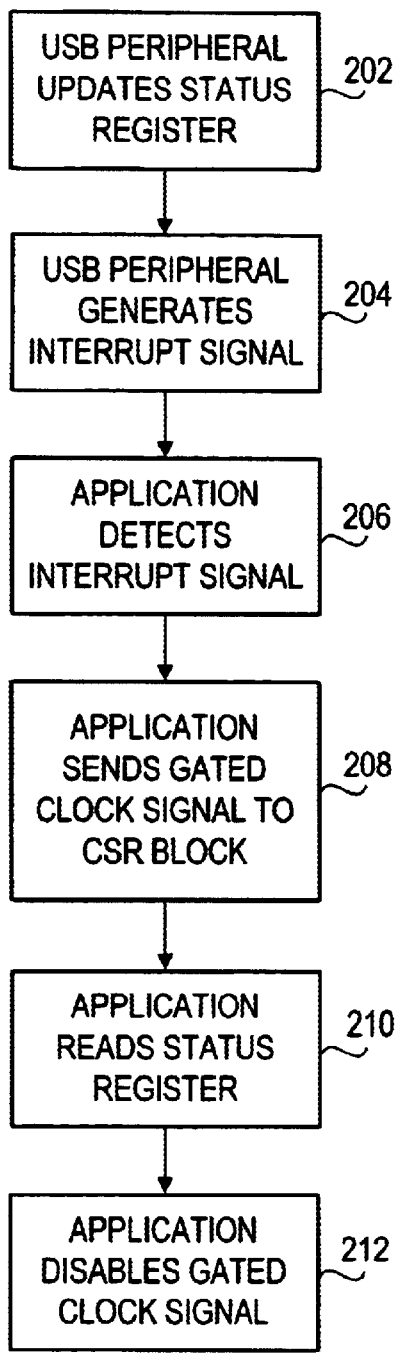
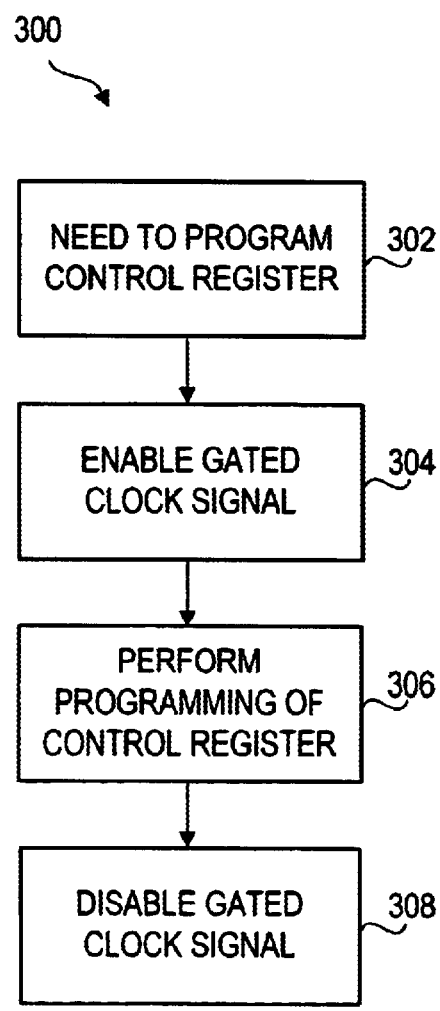
FIG. 2
FIG. 3

POWER SAVING IN A USB PERIPHERAL BY PROVIDING GATED CLOCK SIGNAL TO CSR BLOCK IN RESPONSE TO A LOCAL INTERRUPT GENERATED WHEN AN OPERATION IS TO BE PERFORMED

BACKGROUND OF THE INVENTION

The present invention is related generally to a method and system for reducing power expenditure in an electronic device and, more particularly, to a method and system for providing a gated clock signal to a device which is disabled when not needed.

With the proliferation of buss connected devices, power consumption of electronic devices is becoming an increasing important design consideration. For example, devices operating on a universal serial bus (USB) may receive power from the USB bus. The USB bus provides approximately 0.5 amps of power through each port. Thus, relatively low power devices may be powered through the bus. Consequently, reducing power consumption of USB peripherals is an important design consideration.

USB peripheral designs generally consist of device logic and a set of registers, generally designates as a control and status register (CSR) block. As the name indicates, the set of registers include control registers and status registers. The control registers are typically programmed by an application outside the USB peripheral core. The control registers store different parameters required to implement core functionality of the USB peripheral.

The status registers store event information which occur on the USB bus, or cable. When an event occurs, one or more of the status registers are updated by the USB peripheral core. The application needs to read the status registers to get the updates. A clock signal is used to enable the application to both program and read the respective registers in the CSR block.

In current systems, the clock signal is unfortunately applied in a continuous manner to the CSR block, even though programming and reading of the registers accounts for only about 30 to 35 percent of the total time the USB peripheral is active. Accordingly, applying the clock signal to the CSR block in a continuous manner results in a waste of power. Although reducing power consumption is important to self powered devices, it is particularly important for bus powered devices.

Accordingly, there is a need in the art for a method and system for performing an operation, such as programming or reading, on a CSR block which reduces power consumption and which provides a clock signal to the CSR block substantially only when the CSR block is having an operation being performed thereon, such as programming or reading.

SUMMARY OF THE INVENTION

This need is met by a method and system in accordance with the present invention in which a gated clock signal is provided to a CSR block substantially only when an operation is being performed on the CSR block.

In accordance with one aspect of the present invention, a method for performing an operation by an application on a control and status register block is provided. The application detects when the operation, such as programming one or more control registers or reading one or more status registers, is needed. If the operation is to be performed, a gated clock signal is enabled to the control and status register. The application then performs the operation on the control and status register block based on the gated clock signal. Preferably, the gated clock signal is disabled after the operation has been performed.

In accordance with another aspect of the present invention, a method for reading a status register in an universal serial bus peripheral by an application comprises the steps of detecting when the status register has been updated and providing a gated clock signal to the status register in response to the update. The updated status register is then read by the application based on the gated clock signal. The gated clock signal may be disabled after the status register has been read.

In accordance with yet another aspect of the present invention, a method for programming a control register in an universal serial bus peripheral by an application is provided. First, it is detected when the control register needs to be programmed. When the control register needs to be programmed, a gated clock signal is provided to the control register. The control register is programmed by the application based on the gated clock signal. The gated clock signal may be disabled after the control register has been programmed by the application.

In accordance with a further aspect of the present invention, a system for performing an operation on a control and status register block in a universal serial bus peripheral is provided. Clock gating logic detects when the operation is to be performed and provides a gated clock signal to the control and status register block when the operation is to be performed. Application logic performs the operation on the control and status register block based on the gated clock signal.

The universal serial bus peripheral may generate an interrupt signal when the operation is to be performed. The clock gating logic may comprise an interrupt signal detection unit for detecting the interrupt signal and for enabling the gated clock signal in response to the interrupt signal. The operation may be reading of a status register in the control and status register block and/or programming a control register in the control and status register block. The application logic may comprise a status register read unit for reading the status register based on the gated clock signal. The application logic may comprise a control register program unit for programming a control register in the control and status register block based on the gated clock signal. The clock gating logic may disable the gated clock signal after the control register has been programmed.

In accordance with another aspect of the present invention, a gated clock logic which controls a gated clock signal which enable an operation to be performed on a control and status register block by an application is provided. The clock gating logic comprises a detection unit for detecting when the operation is to be performed. A gated clock signal enable unit provides the gated clock signal to the control and status register block when the operation is to be performed. The gated clock logic may include a gated clock signal disable circuit for disabling the gated clock signal when the operation is completed by the application.

These and other features and advantages of the present invention will become apparent from the following detailed description, the accompanying drawings and the appended claims.

DESCRIPTION OF THE DRAWINGS

The foregoing and other advantages of the invention will become apparent upon reading the following detailed description and upon reference to the drawings in which:

FIG. 2 is a flowchart illustrating a method in accordance with the present invention in which one or more status registers in the CSR block are read by an application;

FIG. 3 is a flowchart illustrating a method in accordance with the present invention in which one or more control registers are programmed by the application;

DETAILED DESCRIPTION OF THE INVENTION

Figure 1:
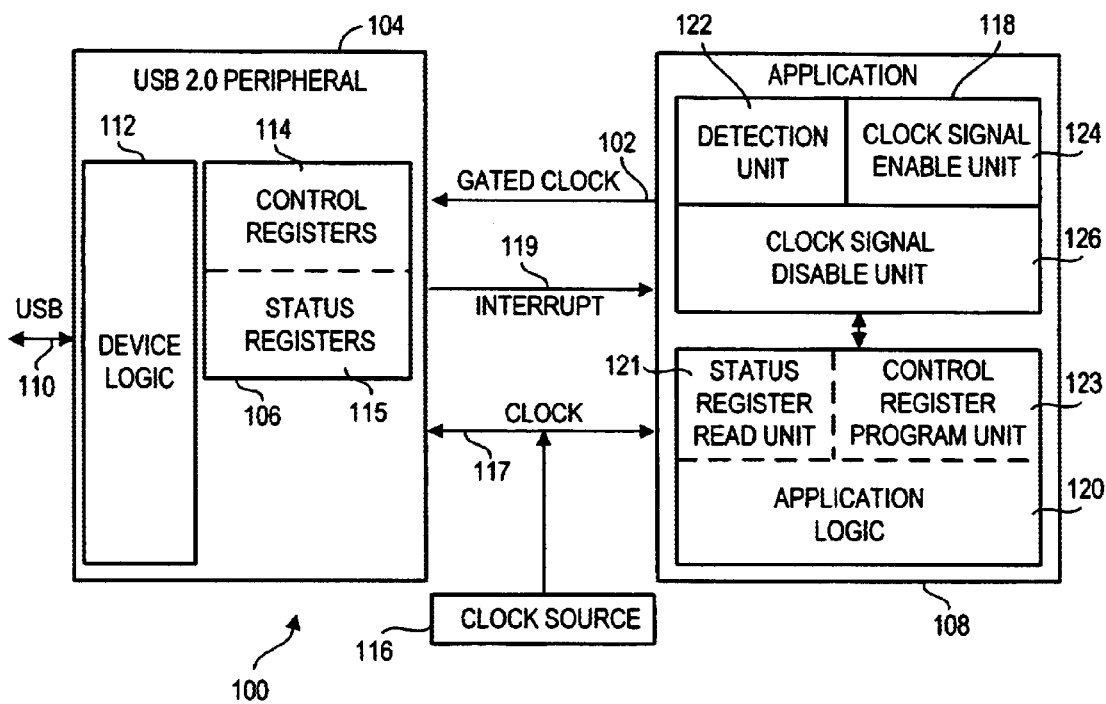
FIG. 1 is block diagram of a system in accordance with an aspect of the present invention in which a gated clock signal is selectively applied to a CSR block.

A system 100 in accordance with one aspect of the present invention is shown in FIG. 1 in which a gated clock signal 102 is provided to a universal serial bus (USB) peripheral 104, and more particularly, to a a control and status register (CSR) block 106, when an operation is being performed by an application 108 on the control and status register block 106. The USB peripheral 104 is connected to a USB bus, or cable, 110 for communicating with other electronic devices, such as a computer. Device logic 112 provide the functionality for the USB peripheral 104.

The CSR block 106 contains control registers 114 and status registers 115. As noted, the control registers are typically programmed by the application 108. The control registers 114 store different parameters required to implement core functionality of the USB peripheral 104. The status registers 115 store event information which occur on the USB cable 110. When an event occurs, one or more of the status registers 115 are updated by the USB peripheral 104. The application 108 reads the status registers 115 to get the updates.

A clock source 116 provides a clock signal 117 to the USB peripheral 104. As is known, the clock signal 117 is provided in a continuous manner to the USB peripheral 104 for the various circuits contained in the peripheral 104. However, in accordance with the present invention, a continuous clock signal is not needed for the CSR block 106.

Gated clock logic 118 controls the gated clock signal 102 which enables an operation to be performed on the CSR block 106 by the application 108. The gated clock logic 118 provides the gated clock signal 102 to the CSR block 106 in response to an interrupt signal 119 generated by the USB peripheral 104. The USB peripheral 104 generates the interrupt signal 119 when one or more of the status registers 115 have been updated. The application 118 contains application logic 120 for performing the operation on the CSR block 106. The application logic 120 may include a status register read unit 121 for reading one or more of the status registers 121 based on the gated clock signal. The application logic 120 may further comprise a control register program unit 123 for programming one or more of the control registers 114 in the control and status register block based on the gated clock signal for reading the status registers 115 and for programming the control registers 114 based on the gated clock signal 102. The clock gating logic 118 comprises detection unit 122 for detecting when the operation is to be performed. The operation may consist of programming the control registers 114 in the CSR block 106 or reading the status registers 115 in the CSR block.

A clock signal enable unit 124 provides the gated clock signal 102 to the CSR block 106 when the operation is to be performed. It should be understood that the gated clock signal 102 may be a portion of the clock signal 117 generated by the clock source 116. Alternatively, the gated clock signal 102 may be provided by another clock source not shown in FIG. 1. A clock signal disable unit 126 in the gated clock logic 118 disables the gated clock signal 102 when the operation is completed by the application 108, or more particularly, the application logic 120.

Referring now to FIG. 2, a flowchart is provided illustrating a method 200 in accordance with the present invention for performing an operation on the CSR block 106. In particular, the flowchart illustrates the reading of the status registers 115 in CSR block 106 by the application 108 in accordance with one aspect of the present invention. The USB peripheral 104 updates one or more of the status registers 115 in step 202. As noted, the USB peripheral 104 updates the status registers 115 in response to events occurring on the USB cable 110.

The interrupt signal 119 is generated by the USB peripheral 104 when one or more of the status registers are updated at step 204. The application 108, or more particularly, the detection unit 122, detects the interrupt signal 119 at step 206. In step 208, the gated clock signal 102 is then enabled by the clock signal enable unit 124 in the gated clock logic 118 and provided to the CSR block 106. The application 108, in particular, the application logic 120, reads the status registers 115 based on the gated clock signal 102 at step 210. The clock signal disable unit 126 then disables the gated clock signal at step 212.

Referring now to FIG. 3, a method 300 in accordance with an aspect of the present invention for programming one or more of the control registers 114 is shown. In step 302, a need to program one or more control registers is detected. The clock signal enable unit 124 then enables the gated clock signal 102 and provides the gated clock signal 102 to the CSR block 106 at step 304. The application logic 120 then performs programming of the one or more control registers 114 in step 306. After the programming has been completed, the clock signal disable unit 126 disables the gated clock signal 102.

Figure 4:
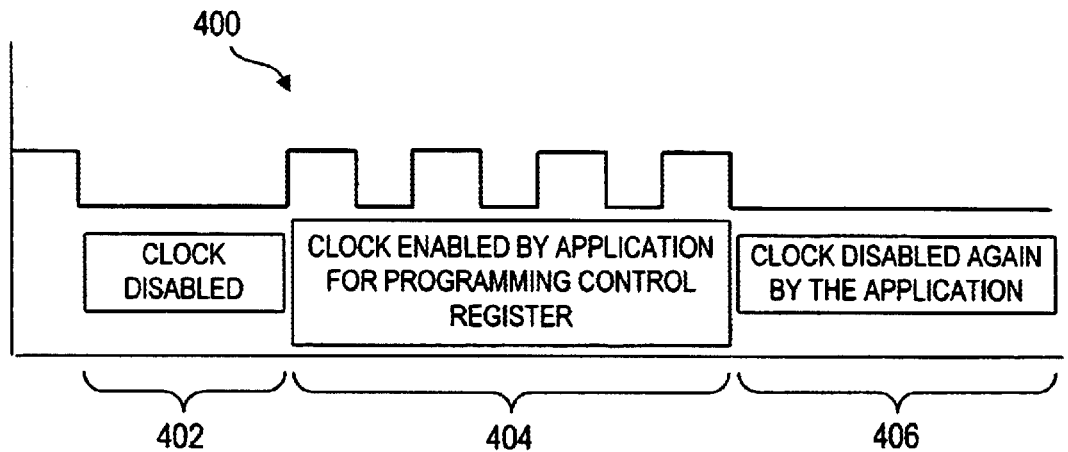
FIG. 4 is a timing diagram showing the gated clock signal implementing the method described in FIG. 3.
Figure 5:
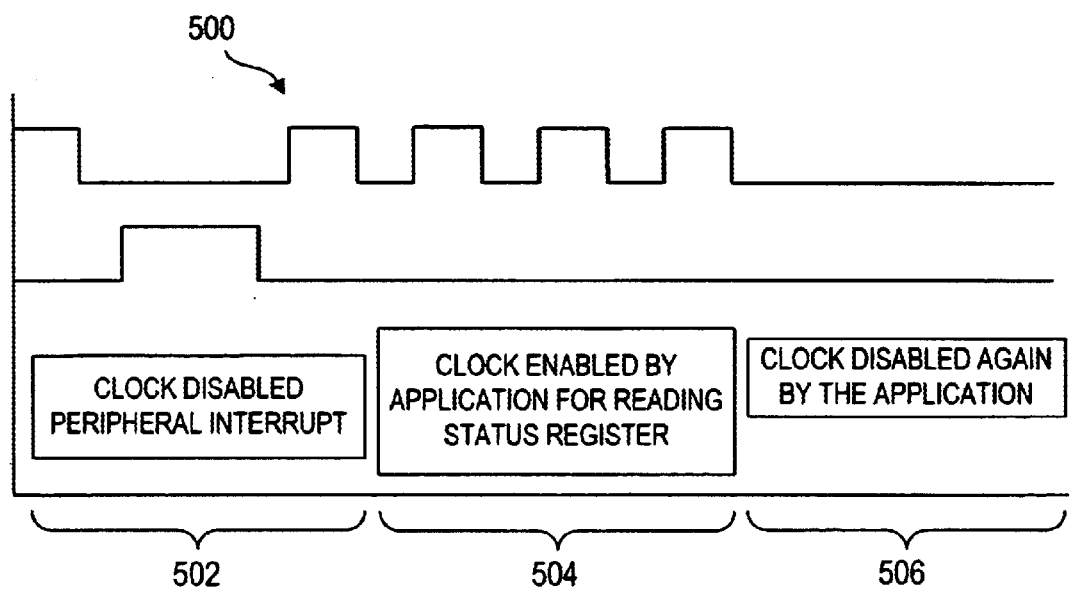
FIG. 5 is a timing diagram showing the gated clock signal implementing the method described in FIG. 2.

FIGS. 4 and 5 are graphical illustrations 400 and 500 of the gated clock signal 102 for programming the control registers 114 and for reading the status registers 115, respectively. In FIG. 4, the gated clock signal 102 is disabled for time period 402. The gated clock signal 102 is then enabled by the application 108 for time period 404 for programming the control registers 114. In time period, the gated clock signal 102 is again disabled by the application 108.

In FIG. 5, the gated clock signal 102 is disabled in time period 502 until the interrupt signal 119 is received from the USB peripheral 104. The gated clock signal 102 is enabled in response to the interrupt signal 119 by the application 104 and the status registers 115 are read in time period 504. In time period 506, the gated clock signal 102 is disabled by the application 104 after the status registers 115 have been read.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method for performing an operation by an application on a control and status register block in a universal serial bus peripheral, the method comprising:

detecting, by the application, when the operation is needed;

enabling a gated clock signal to the control and status register;

performing, by the application, the operation based on the gated clock signal; and disabling the gated clock signal after the operation has been performed, wherein the operation is one of reading a status register and programming a control register in the control and status register block, wherein the universal serial bus peripheral generates an interrupt signal when an update of the status register is performed, and wherein detecting includes detecting the interrupt signal.

2. A method for reading a status register in a universal serial bus peripheral by an application, the method comprising:

detecting an interrupt signal generated by the universal serial bus peripheral when the status register has been updated;

providing a gated clock signal to the status register in response to the update; and reading the updated status register by the application based on the gated clock signal.

3. The method of claim 2, further comprising:

disabling the gated clock signal after the status register has been read.

4. A system for performing an operation on a control and status register block in a universal serial bus peripheral, the system comprising:

clock gating logic for detecting when the operation is to be performed and for providing a gated clock signal to the control and status register block when the operation is to be performed; and application logic for performing the operation on the control and status register block based on the gated clock signal, wherein the universal serial bus peripheral generates an interrupt signal when the operation is to be performed, and wherein the clock gating logic includes an interrupt signal detection unit for detecting the interrupt signal and for enabling the gated clock signal in response to the interrupt signal.

5. The system of claim 4, wherein the operation is reading of a status register in the control and status register block and, wherein the application logic includes a status register read unit for reading the status register based on the gated clock signal.

6. The system of claim 4, wherein the operation comprises programming a control register in the control and status register block by the application logic, and wherein the application logic includes a control register program unit for programming a control register in the control and status register block based on the gated clock signal.

7. The system of claim 6, wherein the clock gating logic disables the gated clock signal after one of the status register has been read and the control register has been programmed.

8. A gated clock logic for controlling a gated clock signal, which enables an operation to be performed on a control and status register block in a universal serial bus peripheral by an application, the universal serial bus peripheral generating an interrupt signal when the operation is to be performed, the clock gating logic comprising:

detection unit for detecting when the operation is to be performed, wherein the detection unit includes an interrupt signal detection unit for detecting the interrupt signal and for enabling the gated clock signal in response to the interrupt signal; and a gated clock signal enable unit for providing the gated clock signal to the control and status register block when the operation is to be performed.

9. The gated clock logic of claim 8, further comprising:

a gated clock signal disable circuit for disabling the gated clock signal when the operation is completed by the application.

* * * * *